United States Patent Office 3,352,698
Patented Nov. 14, 1967

3,352,698
METHOD OF MAKING GLASS CERAMIC
AND PRODUCT
Peter William McMillan, Stafford, and Donald Christopher Lawton, Seabridge, Newcastle, England, assignors to The English Electric Company Limited, London, England, a British company
No Drawing. Filed Jan. 9, 1967, Ser. No. 607,881
Claims priority, application Great Britain, Nov. 30, 1962, 45,318/62; May 29, 1963, 21,558/63
6 Claims. (Cl. 106—39)

ABSTRACT OF THE DISCLOSURE

A strong, opaque glass-ceramic having a low thermal expansion coefficient is produced by heat-treatment from a glass of the following composition, in percentages by weight: $SiO_2$ 59.0–62.0; $Li_2O$ 4.4–5.7; $K_2O$ 3.3–4.2; $ZnO$ 5.1–5.3; and $Al_2O_3$ 17.8–18.6; by the addition as nucleating agents of 1.5–7.5 percent $ZrO_2$ and 1.5–6.0 percent $MoO_3$. In the absence of $MoO_3$ the amount of $ZrO_2$ which can be incorporated in this glass composition, without the occurrence of undissolved particles of $ZrO_2$, which create weaknesses in the product, is insufficient to act as a satisfactory nucleating agent. The addition of $MoO_3$ improves the solubility of the $ZrO_2$ in the glass composition, and makes possible satisfactory nucleation resulting in strong, low-expansion glass-ceramics.

---

This application is a continuation-in-part of U.S. Ser. No. 550,573, filed May 16, 1966, now abandoned, which in turn was a continuation-in-part of U.S. Ser. No. 298,484, filed July 29, 1963 (now abandoned). Priority is claimed of applications in Great Britain No. 45,318/62, filed Nov. 30, 1962 and No. 21,558/63, filed May 29, 1963.

This invention relates to glass-ceramics.

It is known from U.S. Patent No. 3,238,085 (Hayami et al.) to make glass-ceramic materials of the $$SiO_2\text{-}Li_2O\text{-}Al_2O_3$$

glass system using $As_2O_3$ in the range 2–8 percent as the essential nucleating agent. This specification also states that the addition of a small quantity (2–8 percent) of $MoO_3$ or $WO_3$ to the glass composition has the effect of promoting crystallization. However none of the six examples includes $MoO_3$ and the effect of adding this substance cannot therefore be definitely ascertained. It is noteworthy, however, that each of Examples 3, 4 and 5 of Hayami et al., which contain both $As_2O_3$ and $WO_3$, have substantially lower bending strengths than Examples 1 and 2 which contain $As_2O_3$ but not $WO_3$ or $MoO_3$. Since Hayami et al. treats $WO_3$ and $MoO_3$ as equivalent, it may be inferred that the use of a combination of $As_2O_3$ and $MoO_3$ as the nucleating agent will result in a lower strength than the use of $As_2O_3$ alone.

This inference is supported by the disclosure of U.S. Patent 3,117,881 (Henry et al.). This specification deals with a glass system which differs from that of the present application in containing MgO as an essential constituent, whereas applicants' glass system specifically excludes MgO.

Nevertheless, comparison of Examples 31 and 32 of Henry et al. shows that these examples are identical in composition except that Example 31 has 7.0 percent $ZrO_2$, whereas Example 32 has 8.0 percent, and Example 31 has 1.8 percent $TiO_2$ whereas Example 32 has 0.8 percent $MoO_3$; the heat-treatments are also very similar. Yet, whereas Example 31 has a flexural strength of 160,730 p.s.i., Example 32 has a flexural strength of only 32,340 p.s.i.

It must be concluded that, with this glass composition, the addition of $MoO_3$ has an adverse effect, especially since it results in one of the lowest values of flexural strength for any of the thirty-nine examples quoted by Henry et al.

U.S. Patent No. 3,241,985 (Kuwayama) discloses the preparation of glass-ceramics of the $SiO_2\text{-}Li_2O\text{-}Al_2O_3$ glass system using $ZrO_2$ as the nucleating agent, but in no case using $MoO_3$. It will also be noted that although applicants' glass system is the same as that of Kuwayama, the basic glass is separate and distinct in that applicants' percentage range does not overlap that of Kuwayama either in respect of $SiO_2$, or $K_2O$, or $ZnO$.

The glass composition of the product of the present invention is as follows, in percentages by weight:

$SiO_2$ 59.0–62.0; $Li_2O$ 4.4–5.7; $K_2O$ 3.3–4.2; $ZnO$ 5.1–5.3; $Al_2O_3$ 17.8–18.6; $MoO_3$ 1.5–6.0; and $ZrO_2$ 1.5–7.5.

It is an object of the present invention to produce a high-strength glass-ceramic having a low coefficient of thermal expansion.

It is well known in the glass-ceramic art that while it is possible to produce high-strength glass-ceramics (e.g. those of U.S. Patent 3,117,881 Henry et al.), and also to produce glass-ceramics having low coefficients of thermal expansion (e.g. those of U.S. Patent 3,241,985 Kuwayama), it is more dificult to produce glass-ceramics having both high strengths and low coefficients of thermal expansion. Such glass-ceramics have been found to be highly resistant to thermal shock.

It is therefore another object of the present invention to produce a glass-ceramic of novel composition which is highly resistant to thermal shock.

For certain applications it is advantageous to produce glass-ceramics which are opaque, rather than translucent or transparent, for example in the production of containers for food or drugs which are adversely affected by exposure to light. Such containers must be strong, to withstand handling, and it is an advantage if they are resistant to thermal shock.

It is therefore a further object of the present invention to provide an opaque glass-ceramic which is strong and has a low thermal expansion coefficient, whereby it is resistant to thermal shock.

Applicants have found that with glasses containing in weight percentages $SiO_2$ 59.0–62.0; $Li_2O$ 4.4–5.7; $Al_2O_3$ 17.8–18.6; $ZnO$ 5.1–5.3; and $K_2O$ 3.3–4.2, a nucleating agent is necessary for the production of satisfactory glass-ceramics. As a result of the limited solubility of $ZrO_2$ in glass of this composition, the amount of $ZrO_2$ which can be incorporated, when used as the sole nucleating agent, is insufficient to act satisfactorily, and glass-ceramics of this composition to which $ZrO_2$ has been added for the purpose of acting as a nucleating agent have been found to contain undissolved $ZrO_2$, which results in a very weak product.

However, applicants have found that, surprisingly, the use of $MoO_3$ increases the solubility of $ZrO_2$ in the glass composition, and therefore enables sufficient $ZrO_2$ to be used to act as a nucleating agent, while at the same time avoiding the presence of undissolved particles and the coarse structure hitherto found.

It will be apparent that neither $ZrO_2$ nor $MoO_3$ when used alone will enable comparable strong low-expansion glass-ceramics to be produced.

Typical processes for the formation of glass-ceramics in accordance with the invention will now be described by way of example.

Suitable raw materials are melted to form a glass of the desired composition. The raw materials used to introduce the stated oxides may include:

| Raw material: | Oxide |
|---|---|
| Ground quartz or glass-making sand | $SiO_2$ |
| Lithium carbonate | $Li_2O$ |
| Potassium carbonate | $K_2O$ |
| Zinc oxide | $ZnO$ |
| Aluminium oxide or hydrated alumina | $Al_2O_3$ |
| Molybdenum trioxide | $MoO_3$ |
| Zirconium silicate | $ZrO_2$; $SiO_2$ |
| Sodium carbonate | $Na_2O$ |
| Calcium carbonate | $CaO$ |
| Boric acid | $B_2O_3$ |

The batch materials are thoroughly mixed before melting and are melted in crucibles of recrystallized alumina or other suitable refractory material at a temperature of 1500 to 1600° C. in a neutral or slightly reducing atmosphere. This may be achieved, where the furnace atmosphere is strongly reducing, by fitting covers on the crucibles.

The composition of the glass consists essentially of the following ranges of constituents, in percentages by weight: $SiO_2$ 59.0–62.0; $Li_2O$ 4.4–5.7; $K_2O$ 3.3–4.2; $ZnO$ 5.1–5.3; $Al_2O_3$ 17.8–18.6; $MoO_3$ 1.5–6.0; and $ZrO_2$ 1.5–7.5.

As is disclosed and stated in the parent application Ser. No. 298,484, it is seen that the preferred range of crystallization regulators present in the glass is in the proportion of 1.5 to 6.0 percent of molybdenum trioxide and preferably from 2.0 to 6.0 percent of this substance, and another preferred range of percentage composition by weight of molybdenum trioxide ($MoO_3$) 1.5 to 5.0.

The $K_2O$ may be replaced by $Na_2$, or alternatively both $K_2O$ and $Na_2O$ may be present within the range specified; $CaO$ and/or $B_2O_3$ may be present in the range 0–5 percent.

It is preferred that the glasses contain approximately equal amounts of the crystallization regulators $MoO_3$ and $ZrO_2$, and the preferred total content of the two is approximately 10 percent.

The presence of impurities introduced in the batch materials is permissible provided that they do not exceed the limits normally accepted in glass-making processes.

The glasses are then refined and worked by the normal glass-working methods such as casting, drawing or pressing. The articles so produced may be annealed at a temperature in the range 550 to 650° C. if it is desired to store them before heat-treatment, or alternatively the articles may be heat-treated immediately.

The heat-treatment to devitrify the glasses in a controlled manner comprises first heating the articles at a rate not exceeding 10° C. per minute, and preferably at 4 to 5° C. per minute, to a temperature which lies between a temperature 50° C. below the softening point (Mg point) of the glass and a temperature 50° C. above the softening point. In this context the Mg point corresponds to the dilatometric softening temperature at which the glass has a viscosity of $10^{11}$ to $10^{12}$ poises (see, for example, F. V. Tooley "Handbook of Glass Manufacture," pp. 40–41). This temperature is held for at least thirty minutes.

The articles are then further heated at the same rate to a final crystallization temperature in the range 900 to 1100° C. and this temperature is maintained for at least one hour. The exact temperature depends largely on the total alkali content of the glass. The articles are then allowed to cool at not more than 10° C. per minute and preferably at the normal cooling rate of the furnace.

The heat-treatment may be modified by including an intermediate holding stage at a temperature in the range between the softening point and 980° C. and a further holding stage between 900° C. and the final crystallization temperature. The articles may be maintained at these holding temperatures for any desired length of time and it is found that the strength and coefficient of linear thermal expansion of the resulting ceramic products may be varied to a certain extent by modifying the heat-treatment in this way.

A number of examples of the glass composition, heat-treatment conditions, and some of the resulting physical properties of glass-ceramics in accordance with the invention are given in the following tables:

TABLE I

| | Composition, percentage by weight | | | | |
|---|---|---|---|---|---|
| Example | A | B | C | D | E |
| $SiO_2$ | 59.6 | 59.6 | 59.2 | 60.3 | 60.5 |
| $Li_2O$ | 4.4 | 4.4 | 4.4 | 4.8 | 4.7 |
| $K_2O$ | 3.3 | 3.3 | 3.3 | 3.7 | 3.7 |
| $ZnO$ | 5.1 | 5.1 | 5.1 | 5.1 | 5.1 |
| $Al_2O_3$ | 17.8 | 17.8 | 17.8 | 18.1 | 18.1 |
| $MoO_3$ | 4.3 | 5.3 | 2.1 | 4.3 | 3.3 |
| $ZrO_2$ | 5.5 | 4.5 | 7.1 | 3.7 | 4.6 |

| | Heat-treatment | | | | | |
|---|---|---|---|---|---|---|
| Example | A1 | A2 | B | C | D | E |
| Temp., ° C | 580 | (¹) | 580 | 580 | 580 | |
| Time, hrs | 3 | (¹) | 3 | 3 | 3 | |
| Temp., ° C | 980 | (¹) | 980 | 980 | 980 | |
| Time, hrs | 1 | (¹) | 1 | 1 | 1 | |

| | Properties | | | | | |
|---|---|---|---|---|---|---|
| Modulus of rupture, p.s.i. | 19,000 | (¹) | 28,000 | 14,200 | 19,900 | |
| Thermal expansion coefficient $\times 10^7$ (20–500° C.) | 18.7 | (¹) | 20 | 19.4 | 14.5 | |

¹ See text.

TABLE II

| Example | Composition, percentage by weight | | | | | |
|---|---|---|---|---|---|---|
| | F | G | H | I | J | K |
| SiO₂ | 60.5 | 60.7 | 60.6 | 60.7 | 60.5 | 60.8 |
| Li₂O | 4.8 | 5.0 | 5.0 | 5.0 | 5.0 | 5.3 |
| K₂O | 3.7 | 4.0 | 4.0 | 4.0 | 4.0 | 4.0 |
| ZnO | 5.1 | 5.2 | 5.2 | 5.1 | 5.1 | 5.3 |
| Al₂O₃ | 18.1 | 18.2 | 18.2 | 18.2 | 18.1 | 18.3 |
| MoO₃ | 2.2 | 2.2 | 3.3 | 4.2 | 5.4 | 4.4 |
| ZrO₂ | 5.6 | 4.7 | 3.7 | 2.8 | 1.9 | 1.9 |
| Heat-treatment | | | | | | |
| Temp., °C | 580 |  | 580 | 900 | 900 | 580 |
| Time, hrs | 3 |  | 3 | 1 | 1 | 3 |
| Temp., °C | 980 |  | 980 | 1,100 | 1,100 | 980 |
| Time, hrs | 1 |  | 1 | 1 | 1 | 1 |
| Properties | | | | | | |
| Modulus of rupture, p.s.i. | 18,100 |  | 22,400 | 6,950 | 4,750 | 19,500 |
| Thermal expansion coefficient | 21.0 |  | 24.2 | 16.3 | 12.6 | 21.4 |

It is believed that the heat-treatment at the lower temperature leads to the formation of sub-microscopic crystals of complex compounds containing both zirconium and molybdenum dispersed throughout the glassy matrix, and this will be referred to as the nucleation stage.

The heat-treatment at the higher temperature is known as the crystallization stage, and causes the conversion of a substantial part of the composition from a glass to a crystalline structure. The proportion which is thus converted may vary from a value of under 50 percent to a value of nearly 100 percent, and the physical properties may be varied to some extent by varying the proportion converted by a suitable choice of heat-treatment times and temperatures. The properties which can be obtain are, of course, dependent on the glass composition.

All the examples of glass-ceramics given above were opaque and good electrical insulators and, as can be seen from the tables, Examples I and J have moderately high cross-breaking strengths and the remainder have high strengths by the standards of homogeneous glass-ceramics, taking into account the method of testing. In the case of Examples I and J the strength is not less than that of the glass before devitrification and in all other cases the strength is substantially greater than, i.e. about three or four times, that of the undevitrified glass. Coefficients of thermal expansion of up to $25 \times 10^{-7}$ may be considered as low-expansion materials in the art, and it will be seen that the measured values for the examples are all below this figure.

Specific examples using Compositions A and B of Table I above will now be described in greater detail, for a fuller understanding of the invention. A mixture of raw materials to give a glass of the following percentage composition by weight (Composition A) was melted at 1560° C. in a recrystallized alumina crucible:

Silicon dioxide (SiO₂) _____ 59.6
Lithium oxide (Li₂O) _____ 4.4
Potassium oxide (K₂O) _____ 3.3
Zinc oxide (ZnO) _____ 5.1
Aluminum oxide (Al₂O₃) _____ 17.8
Molybdenum trioxide (MoO₃) _____ 4.3
Zirconium dioxide (ZrO₂) _____ 5.5

After refining, the glass was shaped by normal glass-working processes and the articles so formed were then annealed at 600° C. Samples of the glass of Composition A were heat-treated according to two heat-treatment schedules as follows:

*Heat-treatment Schedule I*

(a) Temperature raised at 5° C. per minute to 580° C.
(b) Temperature of 580° C. maintained for three hours.
(c) Temperature further raised at 5° C. per minute to 980° C.
(d) Temperature of 980° C. maintained for one hour.
(e) Temperature reduced at 5–10° C. per minute to room temperature.

*Heat-treatment Schedule II*

(a) Temperature raised at 4–5° C. per minute to 600° C.
(b) Temperature of 600° C. maintained for thirty minutes.
(c) Temperature further raised at 4–5° C. per minute to 800° C.
(d) Temperature of 800° C. maintained for one hour.
(e) Temperature further raised to 1,000° C.
(f) Temperature of 1,000° C. maintained for one hour.
(g) Temperature further raised to 1,050° C.
(h) Temperature of 1,050° C. maintained for one hour.
(i) Temperature reduced at 5–10° C. per minute to room temperature.

The resulting glass ceramics were found to be mechanically strong, the articles produced by heat-treatment Schedule I having a modulus of rupture of 19,000 lbs. per square inch and a coefficient of linear thermal expansion of $18.7 \times 10^{-7}$ per degree C. Those produced by heat-treatment Schedule II had a modulus of rupture of 21,600 lbs. per square inch and a coefficient of linear thermal expansion of $23.5 \times 10^{-7}$ per degree C.

Another mixture of raw materials to give a glass of the following composition in percentages by weight (Composition B) was melted in a recrystallized alumina crucible at 1,560° C.

SiO₂ _____ 59.6
Li₂O _____ 4.4
K₂O _____ 3.3
ZnO _____ 5.1
Al₂O₃ _____ 17.8
MoO₃ _____ 5.3
ZrO₂ _____ 4.5

The glass of Composition B, after refining, was shaped by normal glass-working processes and was annealed at 600° C. Samples of the glass were heat-treated according to the following schedule:

(a) Temperature raised at 5° C. per minute to 580° C.
(b) Temperature of 580° C. maintained for three hours.
(c) Temperature further raised at 5° C. per minute to 980° C.
(d) Temperature maintained at 980° C. for one hour.
(e) Temperature reduced at 5–10° C. per minute to room temperature.

The resulting articles were mechanically strong, having a modulus of rupture of 28,000 lbs. per square inch and a coefficient of linear thermal expansion of $20 \times 10^{-7}$ per degree C.

What we claim as our invention and desire to secure by Letters Patent is:

1. In a method of making a glass-ceramic product including the steps of melting glass batch materials to form a glass, said materials including $ZrO_2$ as a nucleating agent, and heat-treating the resulting glass by heating it to a crystallization temperature in the range 900–1,100° C. until a product which is at least partially microcrystalline is obtained, the improvement which comprises selecting batch materials to form a glass consisting essentially of, in percentages by weight:

| | |
|---|---|
| $SiO_2$ | 59.0–62.0 |
| $Li_2O$ | 4.4–5.7 |
| $K_2O$ and $Na_2O$ | 3.3–4.2 |
| ZnO | 5.1–5.3 |
| $Al_2O_3$ | 17.8–18.6 |
| CaO | 0–5 |
| $B_2O_3$ | 0–5 | and adding materials to the batch to form in the glass $ZrO_2$ in the range 1.5–7.5 weight percent and $MoO_3$ in the range 1.5–5.0 weight percent, whereby the presence of $MoO_3$ enables $ZrO_2$ in the range given to be completely dissolved in the glass and to act as a nucleating agent, and whereby the resulting glass-ceramic produced is opaque, has a coefficient of thermal expansion not exceeding $25 \times 10^{-7}$ (20–500° C.) and has a cross-breaking strength not less than that of the glass before devitrification.

2. A method as claimed in claim 1, wherein the glass is heat-treated at a nucleation temperature of substantially 580° C. and then at a crystallization temperature of substantially 980° C., whereby the resulting glass-ceramic has a cross-breaking strength which is substantially greater than that of the glass before devitrification.

3. A method as claimed in claim 1, wherein said batch materials, apart from $ZrO_2$ and $MoO_3$, consist essentially of, in percentages by weight:

| | |
|---|---|
| $SiO_2$ | 59.0–62.0 |
| $Li_2O$ | 4.4–5.7 |
| $K_2O$ | 3.3–4.2 |
| ZnO | 5.1–5.3 |
| $Al_2O_3$ | 17.8–18.6 |

4. A product by the process of claim 1.
5. A product by the process of claim 2.
6. A product by the process of claim 3.

References Cited

FOREIGN PATENTS 1,099,135   2/1961   Germany.

DONALL H. SYLVESTER, *Primary Examiner.*

G. R. MYERS, *Assistant Examiner.*